United States Patent
Gendotti et al.

(10) Patent No.: US 10,274,619 B2
(45) Date of Patent: Apr. 30, 2019

(54) NEUTRON CONVERSION FOIL, NEUTRON DETECTING DEVICE WITH SUCH A FOIL, AND METHOD FOR OPERATING SUCH A NEUTRON-DETECTING DEVICE

(71) Applicant: Arktis Radiation Detectors Ltd., Zurich (CH)

(72) Inventors: Ulisse Gendotti, Zurich (CH); Rico Chandrasekharan, Zurich (CH)

(73) Assignee: ARKTIS RADIATION DETECTORS LTD., Zurich (CH)

( * ) Notice: Subject to any disclaimer, the term of this patent is extended or adjusted under 35 U.S.C. 154(b) by 0 days.

(21) Appl. No.: 15/538,389

(22) PCT Filed: Dec. 21, 2015

(86) PCT No.: PCT/EP2015/080822
§ 371 (c)(1),
(2) Date: Jun. 21, 2017

(87) PCT Pub. No.: WO2016/102484
PCT Pub. Date: Jun. 30, 2016

(65) Prior Publication Data
US 2018/0024256 A1    Jan. 25, 2018

(30) Foreign Application Priority Data
Dec. 22, 2014  (CH) ...................................... 2024/14

(51) Int. Cl.
*G01T 3/06*       (2006.01)
*G01N 23/09*   (2018.01)
*G21K 4/00*      (2006.01)

(52) U.S. Cl.
CPC ............ *G01T 3/065* (2013.01); *G01N 23/09* (2013.01); *G01T 3/06* (2013.01); *G21K 2004/02* (2013.01);
(Continued)

(58) Field of Classification Search
CPC ........... G01T 3/06; G01T 1/201; G01T 1/167; G01T 1/2018; G01T 3/00
See application file for complete search history.

(56) References Cited

U.S. PATENT DOCUMENTS 3,891,852 A    6/1975  Bollen et al.
5,774,515 A *  6/1998  Fujiwara ................... G01T 3/06
                                                                251/367
(Continued)

FOREIGN PATENT DOCUMENTS

CA    2312593 A1    2/2001
GB    2474720 A     4/2011
(Continued)

*Primary Examiner* — David Porta
*Assistant Examiner* — Mamadou Faye
(74) *Attorney, Agent, or Firm* — The Webb Law Firm

(57) ABSTRACT

A neutron conversion foil for being used in a neutron detector includes a substrate having a first and second side. The substrate is covered at least on one of the first and second sides with a neutron conversion layer made of a neutron reactive material and being capable of capturing neutrons to thereafter emit light and/or charged particles. The neutron conversion foil is transparent to light such that light originating from the conversion of neutrons can pass through one or several of the neutron conversion foils and thereafter be collected and detected by a light sensing device.

30 Claims, 12 Drawing Sheets

(52) U.S. Cl.
CPC ..... *G21K 2004/04* (2013.01); *G21K 2004/10* (2013.01); *G21K 2004/12* (2013.01)

(56) References Cited

U.S. PATENT DOCUMENTS

| | | | |
|---|---|---|---|
| 6,373,066 B1 | 4/2002 | Penn | |
| 6,867,444 B1* | 3/2005 | Hughes | G01T 3/08 |
| | | | 257/252 |
| 8,022,369 B2 | 9/2011 | Orava et al. | |
| 8,294,114 B2 | 10/2012 | Chandrasekharan | |
| 8,502,158 B1 | 8/2013 | Gordeev et al. | |
| 8,519,350 B2 | 8/2013 | McGregor et al. | |
| 8,952,337 B2 | 2/2015 | Menge et al. | |
| 9,707,710 B2* | 7/2017 | Menge | G01V 5/0091 |
| 2005/0258373 A1 | 11/2005 | Lacy | |
| 2007/0102647 A1 | 5/2007 | Johnson et al. | |
| 2009/0012745 A1 | 1/2009 | Longman et al. | |
| 2009/0166549 A1 | 7/2009 | Czirr | |
| 2009/0294686 A1* | 12/2009 | Chandrasekharan | G01T 1/185 |
| | | | 250/391 |
| 2009/0302226 A1* | 12/2009 | Schieber | G01T 3/08 |
| | | | 250/370.02 |
| 2010/0276602 A1 | 11/2010 | Clothier et al. | |
| 2010/0294943 A1* | 11/2010 | Frank | G01T 3/06 |
| | | | 250/367 |
| 2012/0292519 A1* | 11/2012 | Frank | G01T 1/201 |
| | | | 250/367 |
| 2013/0034198 A1* | 2/2013 | Chandrasekharan | G01T 3/001 |
| | | | 376/159 |
| 2013/0146775 A1* | 6/2013 | Ramsden | G01T 1/203 |
| | | | 250/362 |
| 2013/0228696 A1 | 9/2013 | McGregor et al. | |
| 2014/0224964 A1 | 8/2014 | Solomon et al. | |

FOREIGN PATENT DOCUMENTS

| | | |
|---|---|---|
| WO | 2007121876 A2 | 11/2007 |
| WO | 2010144227 A2 | 12/2010 |
| WO | 2012007734 A2 | 1/2012 |
| WO | 2015131124 A1 | 9/2015 |

* cited by examiner

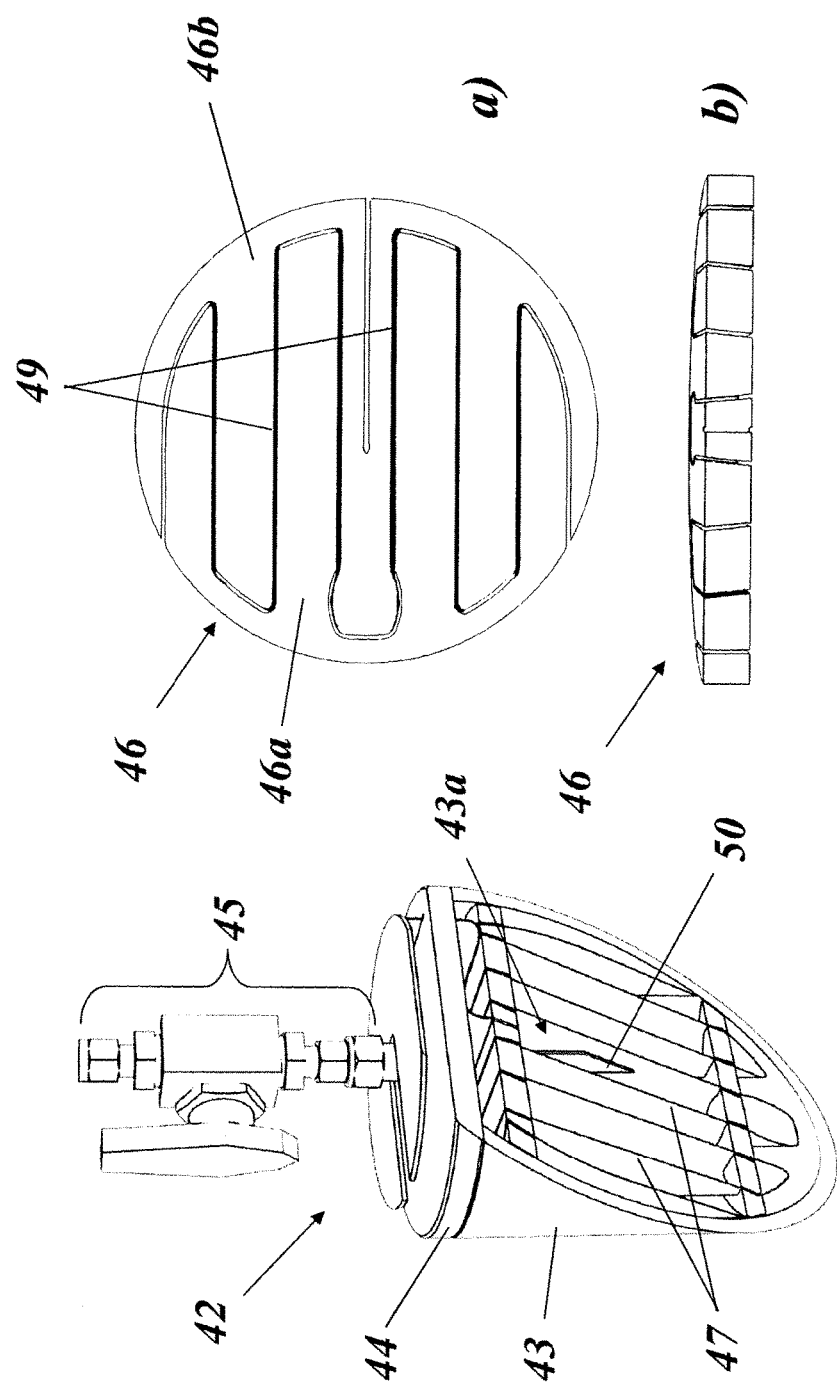

NEUTRON CONVERSION FOIL, NEUTRON DETECTING DEVICE WITH SUCH A FOIL, AND METHOD FOR OPERATING SUCH A NEUTRON-DETECTING DEVICE

This invention was made with Government support under Contract No. HR0011-14-C-0094 awarded by the Defense Advanced Research Projects Agency. The Government has certain rights to this invention.

CROSS-REFERENCE TO RELATED APPLICATIONS

This application is the United States national phase of International Application No. PCT/EP2015/080822 filed Dec. 21, 2015, and claims priority to Swiss Patent Application No. 02024/14 filed Dec. 22, 2014, the disclosures of which are hereby incorporated in their entirety by reference.

BACKGROUND OF THE INVENTION

Field of the Invention

The present invention relates to the technology of detecting neutrons. It refers to a neutron conversion foil.

It further refers to a neutron-detecting device with such a foil; and it refers to a method for operating such a neutron-detecting device.

Description of Related Art

Document WO 2012/007734 A2 describes a radiation detector for neutrons and gamma rays with a conversion layer comprising a neutron capturing material and a phosphor, such that neutrons are converted into light signals. These light signals are then allowed to enter into a light guide, the light guide contains a wavelength shifter that absorbs the light and reemits at a longer wavelength. Reemission is isotropic, such that a fraction of the reemitted light can be transported via total internal reflection inside the light guide, until detected via a photoelectric converter, e.g. photomultiplier or similar device. In one embodiment, the light guide may be a scintillator.

Document CA 2 312 593 A1 describes a scintillator surrounded by a neutron conversion layer within a gamma radiation shield. The scintillator detects gamma rays of characteristic energy emitted by said conversion layer upon neutron capture.

Document US 20050258373 A1 discloses a neutron detector technology based on <10>B thin film conversion of neutrons and detection of neutron capture reaction products in a counter gas within a thin straw tube detector body is described. This neutron detector is based on gas-filled thin wall straw tubes, modified for the conversion of neutrons in a very thin coating, or layer, of <10>B, applied for example as a sputter-coated film of <10>B4C, that lines the interior, or inside of the straw tube surface; and the sub-sequent detection of the neutron reaction products in the counter gas.

Document WO 2007/121876 A2 describes a radiation detector based on noble gas scintillation, where pulse shape discrimination is used to distinguish different particle interactions, such as for example fast neutrons from gamma rays.

Document U.S. Pat. No. 8,519,350 discloses surfaces or surface portions incorporated into gas-filled neutron detectors, which are coated with and/or composed of at least partially, neutron reactive material. The surfaces may be flat or curved fins or plates, foils, porous or filamentary material, or semi-solid material or aerogel. The incorporation of the extended surfaces coated with or composed of neutron reactive material increases the neutron detection efficiency of the gas-filled detectors over conventional coated designs. These surfaces or surface portions increase the amount of neutron reactive material present in the detector over conventional coated designs and, as a result, increase the neutron detection efficiency. The surfaces can be made of conductive, semiconductive or insulative materials. The surfaces are arranged such that they do not detrimentally detract from the main function of a gas-filled detector with particular attention to gas-filled pro-portional detectors.

Document US 20130146775 A1 describes a radiation detector for neutrons and gamma rays. The detector includes a conversion screen comprising a mixture of a neutron absorbing material, e.g. containing 6Li, and a phosphorescent material, e.g. ZnS(Ag) and a wavelength-shifting light-guide arranged to receive photons emitted from the phosphorescent material and generate wavelength-shifted photons therefrom. The wavelength-shifting light-guide is doped so as to form a gamma-ray scintillator material operable to generate scintillation photons in response to a gamma-ray detection event therein. A photo detector is optically coupled to the wavelength-shifting light-guide and arranged to detect the wavelength-shifted photons and the scintillation photons. Signals from the photo detector are processed to distinguish neutron detection events from gamma ray detection events.

However, there is still a need to simplify the detectors and improve the efficiency for detecting neutrons.

SUMMARY OF THE INVENTION

It is an object of the invention, to improve neutron-detecting technology by simplifying the structures used and improving the neutron detecting efficiency.

These and other objects are obtained by a neutron conversion foil, a neutron-detecting device using this foil, and a method for operating such neutron-detecting device as disclosed herein.

The neutron conversion foil according to the invention comprises a substrate having a first and second side, whereby said substrate is covered at least on one of said first and second sides with a neutron conversion layer made of a neutron reactive material and being capable of capturing neutrons to thereafter emit light and/or charged particles, whereby said neutron conversion foil is transparent to light such that light originating from the conversion of neutrons can pass through one or several of said neutron conversion foils and thereafter be collected and detected by a light sensing device.

According to an embodiment of the invention that said substrate is covered on said first and second sides with a neutron conversion layer made of a neutron reactive material and being capable of capturing neutrons to thereafter emit light and/or charged particles.

According to another embodiment of the invention said neutron conversion layer contains Li-6 or B-10.

Specifically, said neutron conversion layer contains LiF and a suitable binder in a weight ratio between 1:1 and 15:1, and that appropriate measures such as LiF nanosizing or refractive index matching are performed to ensure high transparency.

Specifically, said neutron conversion layer has a layer thickness of between 1 μm and 40 μm, especially between 3 μm and 20 μm.

According to a further embodiment of the invention said substrate is a transparent PET foil.

Specifically, said transparent PET foil has a thickness of between 2 µm and 19 µm.

According to just another embodiment of the invention each of said neutron conversion layers is overcoated with a wavelength shifting layer being capable of shifting short wavelength light impinging upon it and reemitting light with a wavelength to which said neutron conversion foil is transparent, Specifically, said wavelength shifting layer contains Tetra Phenyl Butadiene (TPB), an organic wavelength shifter, or an organo silicate compound.

More specifically, said wavelength shifting layer has a layer thickness of between 0.05 µm and 1 µm, especially between 0.05 µm and 0.2 µm.

According to another embodiment of the invention the scintillating medium emits light of a wavelength that does not require any further wavelength shifting on the converter foil. This may be achieved by doping noble gas appropriately, for example with nitrogen.

According to another embodiment of the invention said substrate is a mesh.

The neutron detecting device according to the invention comprises a scintillation volume filled with a scintillating material such as a noble gas, whereby one or more neutron conversion foils according to the invention are provided in said neutron detecting device to be in optical contact with said scintillating material such that charged conversion products arising from said neutron capture in said neutron conversion foil(s) escape into said scintillation volume and produce light, to which (if necessary after being shifted to the correct wavelength by a wavelength shifter) said neutron conversion foil(s) is (are) transparent.

An embodiment of the neutron-detecting device according to the invention is characterized in that at least one light-sensing device is provided in optical contact with said scintillation volume.

Specifically, said at least one light sensing device is a solid state light sensor, especially one of a silicon photomultiplier (SiPM) or pixelated Geiger mode avalanche photodiode. Specifically, said scintillation volume is composed primarily of a noble gas such as helium, argon or xenon or a mixture of noble gases, such as helium doped with xenon.

More specifically, said scintillation volume is predominantly filled with helium, thereby allowing the simultaneous measurement and distinction of fast neutrons, thermal neutrons, and/or photons and electrons produced by the interaction of photons with a detector wall.

Alternatively, said scintillation volume may be predominantly filled with xenon, thereby allowing gamma spectrometry to be performed while also measuring neutrons.

Specifically, said scintillation volume contains predominantly PVT or a liquid scintillator, thereby allowing the simultaneous measurement of gammas and neutrons.

Specifically, said at least one solid state light sensor is arranged within said scintillation volume.

Furthermore, an in-situ gas purification device such as a getter may be immersed in the gas of said scintillation volume, thereby assuring a stable gas composition.

Another embodiment of the neutron detecting device according to the invention is characterized in that said scintillation volume is surrounded by a highly reflective material in the area of which a plurality of light sensing devices can be interspersed.

The scintillation volume (in which the neutron converter foil(s) are immersed) is surrounded by highly reflective material in order to efficiently reflect light directly or indirectly to one or more light sensors.

A further embodiment of the neutron-detecting device according to the invention is characterized in that plural neutron conversion foils are arranged in parallel in said scintillation volume.

According to another embodiment of the invention neutron detecting device is part of a detector system, wherein a plurality of detector subunits are connected with a control center for evaluating detector data via a wireless network.

Especially, said neutron detecting device may be part of at least one of said detector subunits.

Furthermore, said neutron detecting device may be connected within said detector subunit to a single board computer, which itself is connected to a network unit and comprises detector software and a data aggregation software/network protocol.

Moreover, a GPS unit for determining the actual position of said detector subunit may be connected to said single board computer.

According another embodiment of the invention the presence, the intensity and/or the type of gamma radiation interacting with the scintillating volume is determined by analyzing the distribution of the energy spectrum of the interaction events accumulated during a predetermined period of time of operation, especially in a range from 1 to 100 seconds.

According another embodiment of the invention two overlapping spectral distributions resulting from the simultaneous interaction of gamma radiation and neutron radiation with the scintillating volume and/or the converter foil and being accumulated during a predetermined period of time of operation, especially in a range from 1 to 100 seconds, are analyzed employing statistical methods, whereby a net neutron count rate is determined by subtracting the spectral response obtained by the gamma radiation from the total spectrum.

In the inventive method for operating a neutron detecting device according to the invention signals arising from a neutron conversion in said one or more neutron conversion foils are discerned from signals arising from said scintillation volume by pulse shape discrimination, whereby the signals involving light emitted by said one or more neutron conversion foils typically have a different time structure than the signals from said scintillation volume.

Specifically, light signals arising directly or indirectly from said neutron conversion in said one or more neutron conversion foils are discerned from signals from said scintillation volume alone by pulse shape discrimination, whereby the signals from neutron conversion typically have a different time structure than the signals from said scintillation volume.

This invention bears similarity with US 20130228696 A1 (see FIG. 20) in that several thin converters are stacked in order to achieve high neutron detection efficiency. Similar to US 20130228696 A1, the converters are thin enough so as to allow escape of neutron conversion products into the gas. Unlike US 20130228696 A1, the present invention collects light to detect an optical signal, thus there is no need for one or more electrodes to generate an electric field for charge signal collection across the cavity. In the present invention, the converters are optically transparent, allowing optical signals to pass through converters as they get collected onto the surface of a light-sensing device such as a silicon photomultiplier (SiPM).

BRIEF DESCRIPTION OF THE DRAWINGS

The present invention is now to be explained more closely by means of different embodiments and with reference to the attached drawings.

FIG. 11 shows details of the head of the device according to FIGS. 9 and 10;

FIG. 12 shows one of the moderating plates supporting the meandering converter membrane, of the device according to FIGS. 9 and 10 in a top view (a) and sectional view (b);

DETAILED DESCRIPTION OF DIFFERENT EMBODIMENTS OF THE INVENTION

An aspect of the present invention is an optically transparent neutron converter foil.

Transparent in this case means that the foil absorbs only a few % (preferably not more than 1%) of the visible light (especially with a wavelength around 420 nm +/−30 nm).

Figure 1:
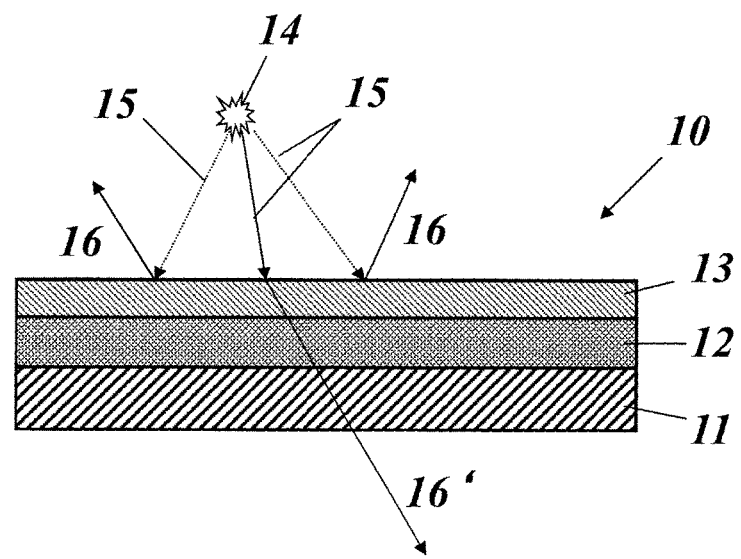
FIG. 1 shows in a longitudinal cross section the structure and function of a single-sided neutron converter foil with a sheet substrate and wavelength shifting properties according to an embodiment of the invention.

FIG. 1 shows in a longitudinal cross section the structure and function of a single-sided neutron converter foil according to an embodiment of the invention. The neutron converter foil 10 comprises an optically transparent substrate 11, which is on one side (upper side in FIG. 1) covered or coated with an optically transparent neutron converter layer 12 and an optically transparent wavelength shifting layer 13.

Substrate 11 is in this case a transparent PET foil with a thickness of between 2 μm and 19 μm.

Neutron converter layer 12 contains Li-6 or B-10. Preferably, it contains 95% or higher enriched $^6$LiF and a suitable binder in a weight ratio between 1:1 and 15:1. It has a layer thickness of between 1 μm and 40 μm, preferably between 3 μm and 20 μm. The coating of substrate 11 with neutron converter layer 12 is performed in such a way that the coating is highly transparent and adheres well to substrate 11. Furthermore, appropriate measures such as nano-sizing LiF crystals or refractive index matching are performed to ensure high transparency.

Thin wavelength shifting layer 13 is capable of shifting short wavelength light 15 impinging upon it and reemitting (visible) light 16 with a wavelength to which neutron conversion foil 10 is highly transparent (light 16' in FIG. 1). Wavelength shifting layer 13 contains Tetra Phenyl Butadiene (TPB), an organic wavelength shifter, or an organo silicate compound, and has a layer thickness of between 0.05 μm and 1 μm, especially between 0.05 μm and 0.2 μm.

As said before, if short wavelength light 15, such as light emanating from a neighboring noble gas scintillation incident 14, falls upon wavelength shifting layer 13, it gets shifted to visible light 15. The converter membrane is highly transparent to visible light, so that light 16' may cross the foil without notable absorption.

Neutron converter foil 10 of FIG. 1 is a single-sided foil, i.e. substrate 11 is coated with layers 12 and 13 only on one side.

Figure 2:
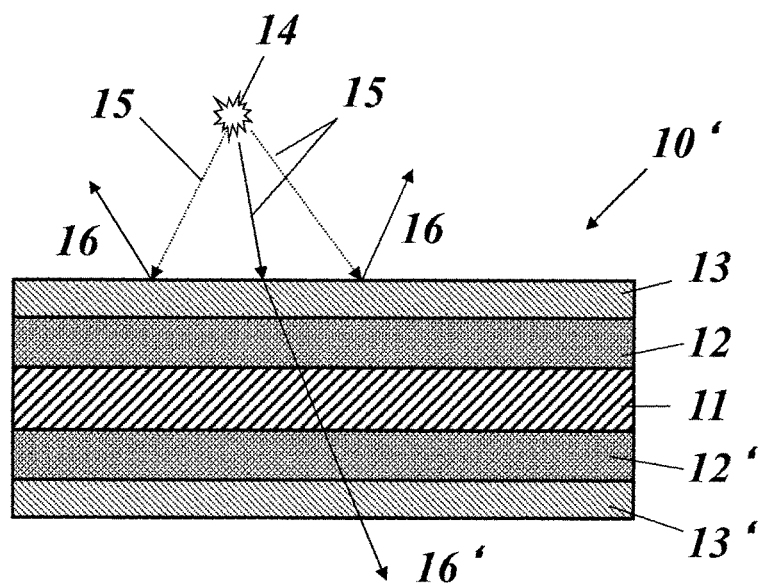
FIG. 2 shows, similar to FIG. 1, in a longitudinal cross section the structure and function of a double-sided neutron converter foil with a sheet substrate and wavelength shifting properties according to another embodiment of the invention.

However, when the foil is arranged in a scintillation volume, thereby surrounded by a noble gas or other scintillation means, it is favorable to have a double-sided neutron converter foil 10' as shown in FIG. 2. In this embodiment, both sides of substrate 11 are coated with neutron conversion layers 12, 12' and wavelength shifting layers 13, 13'. Again, neutron converter foil 10' is highly transparent to visible light 16', which for example has been shifted by one of the wavelength shifting layers 13 and 13'. Thicknesses and layer materials of the various layers are the same as for neutron converter foil 10 of FIG. 1.

Figure 3:
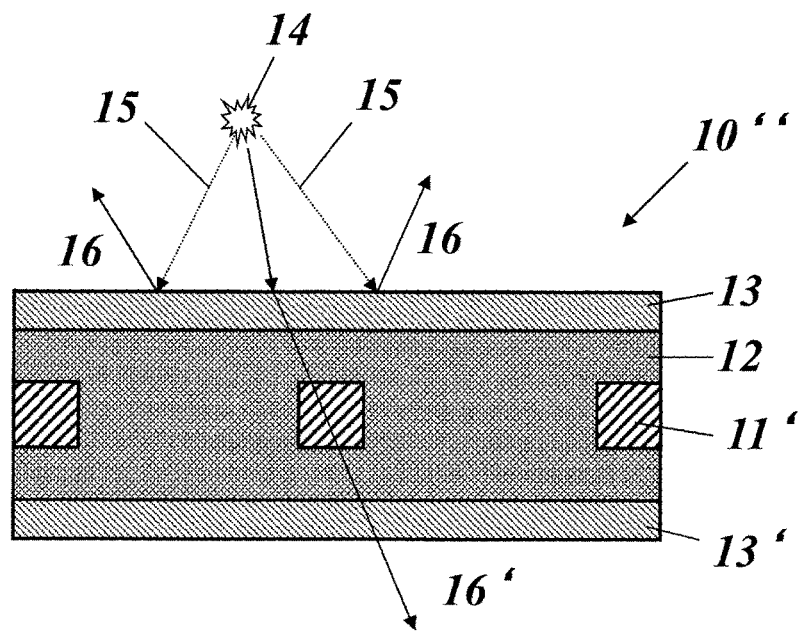
FIG. 3 shows in a longitudinal cross section the structure and function of a double-sided neutron converter foil with a mesh substrate and wavelength shifting properties according to another embodiment of the invention.

According to another preferred embodiment shown in FIG. 3, the substrate 11' is a mesh of polystyrene, polyamide, or other suitable material. Neutron converter foil 10" in this case has the advantage that more neutron conversion material in mesh-embedding neutron conversion layer 12 is ready to convert a neutron into respective decay products, thereby achieving higher efficiency with thinner coatings while minimizing the energy loss of decay products in the substrate.

Figure 4:
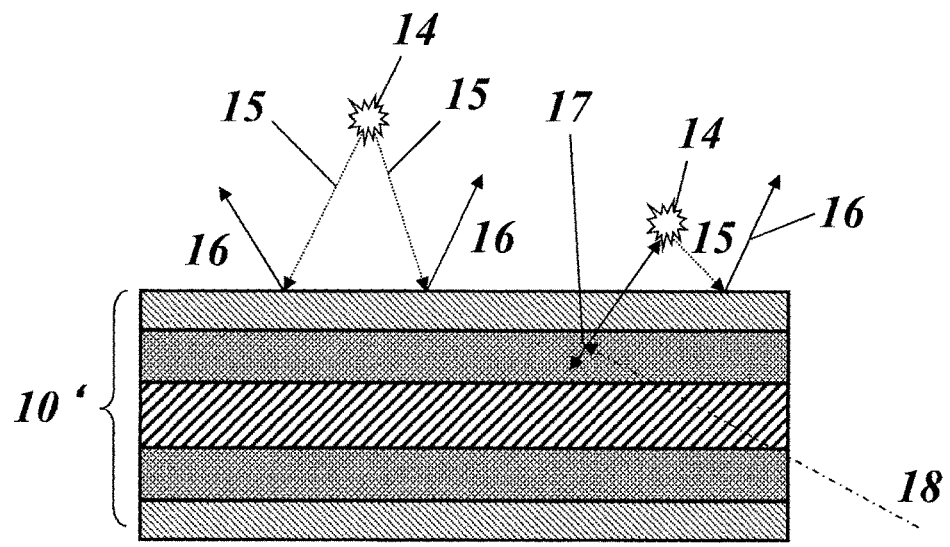
FIG. 4 shows, similar to FIG. 2, in a longitudinal cross section the function of a neutron converter foil converting thermal neutrons to conversion products, conversion products escaping the converter foil to enter a scintillation volume, causing the emission of light.

An important functionality of the converter membranes or foils 10, 10' and 10" is shown for neutron converter foil 10' in FIG. 4: Incoming neutrons 18 get captured by the neutron converting material, decaying into decay products 17 that can escape into the neighboring scintillation volume causing a scintillation incident 14. Short wavelength scintillation light 15 gets shifted to visible light 16, to which the membrane or foil 10' is transparent.

Figure 5:
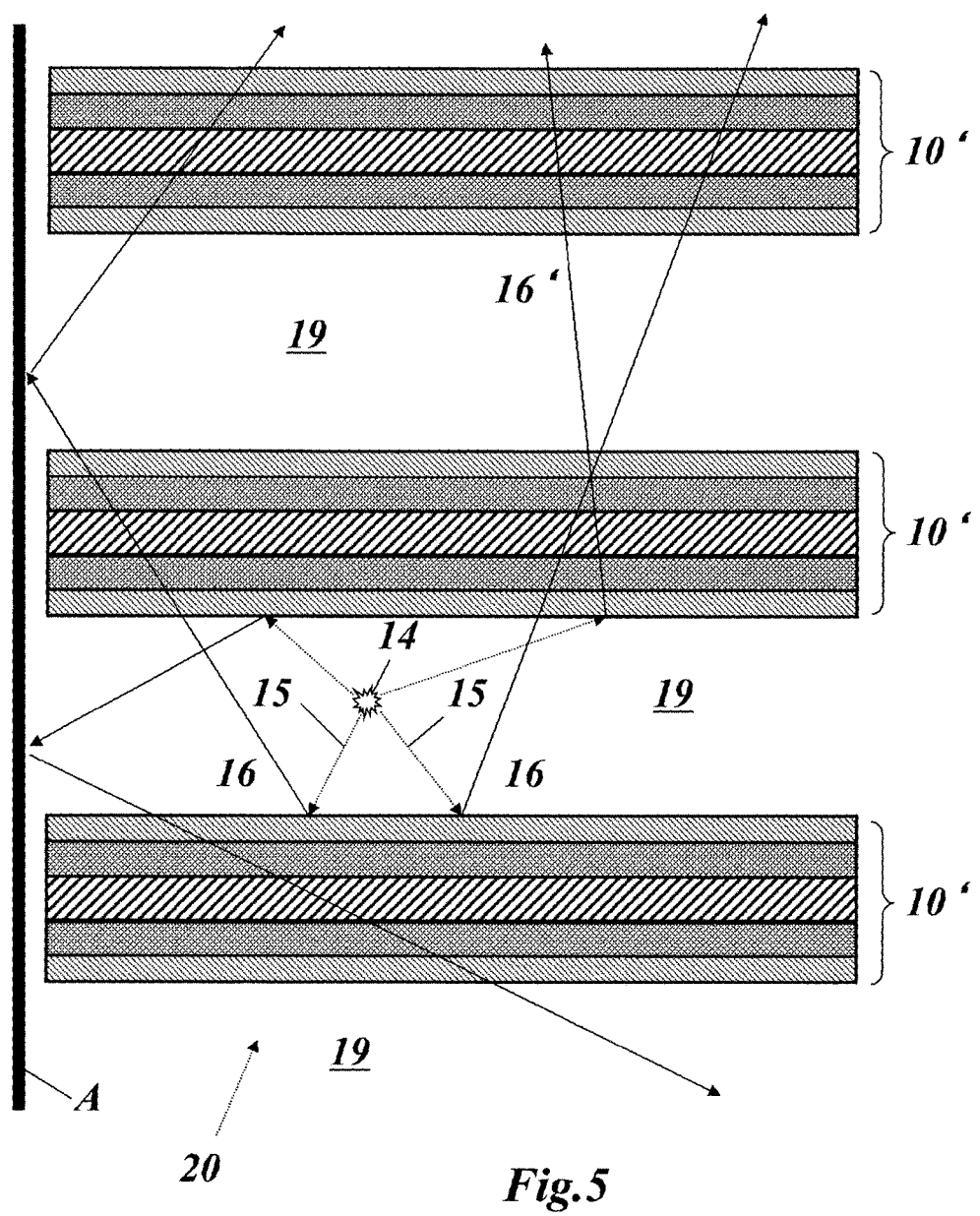
FIG. 5 shows part of a neutron detecting device or arrangement comprising a stack of several neutron converter foils or membranes similar to FIG. 2, where the light arising from a neutron capture event can pass through said neutron converter membranes and be collected upon light sensing devices, with the help of reflectors.

FIG. 5 shows an embodiment of the neutron detecting device (detector) 20, where several such double-sided membranes or foils 10' are suspended in a scintillation volume 19, which is for example filled with a noble gas. The surrounding walls are covered with a highly reflective material A such as a dielectric mirror or diffuse reflector with one or more apertures (not shown in FIG. 5), through which photons can impinge on one or more light sensitive devices (B in FIG. 6), such as Silicon Photomultipliers (SiPMs) (41 in FIG. 8). Visible light 16, 16' emanating from the various wavelength shifting layers crosses the foils 10' nearly without attenuation, is reflected reflecting walls (A) and can be collected by light sensitive devices.

Figure 6:
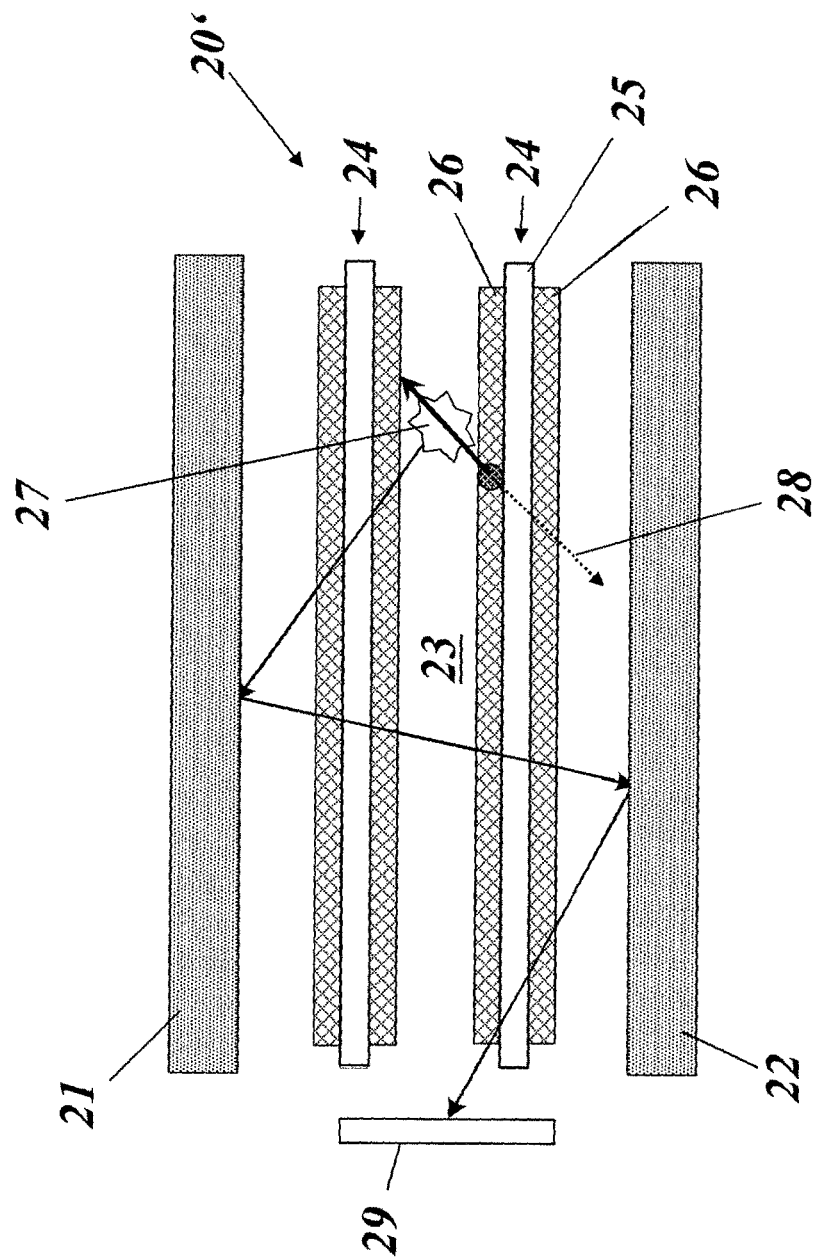
FIG. 6 shows an embodiment of a neutron-detecting device, where the neutron converter membranes are thin enough to allow decay products to escape on both sides of the foil, thereby almost doubling efficiency.

FIG. 6 shows another embodiment of the invention, where in neutron detecting device 20' converter membranes 24 are placed in a scintillation volume 23 between opposite reflectors 21 and 22. For each converter membrane 24, a transparent LiF coating is applied to both sides of a substrate 25 made of quartz, polyvinyltoluene or other transparent material. However, care must be taken to keep the transparent layers sufficiently thin, such that gamma radiation does not deposit large amounts of energy by scintillation. Again, decay products (triton 28) of a captured neutron cause a scintillation incident 27, the light of which reaches light sensitive device 29 after crossing the foils 24 several times.

Figure 7:
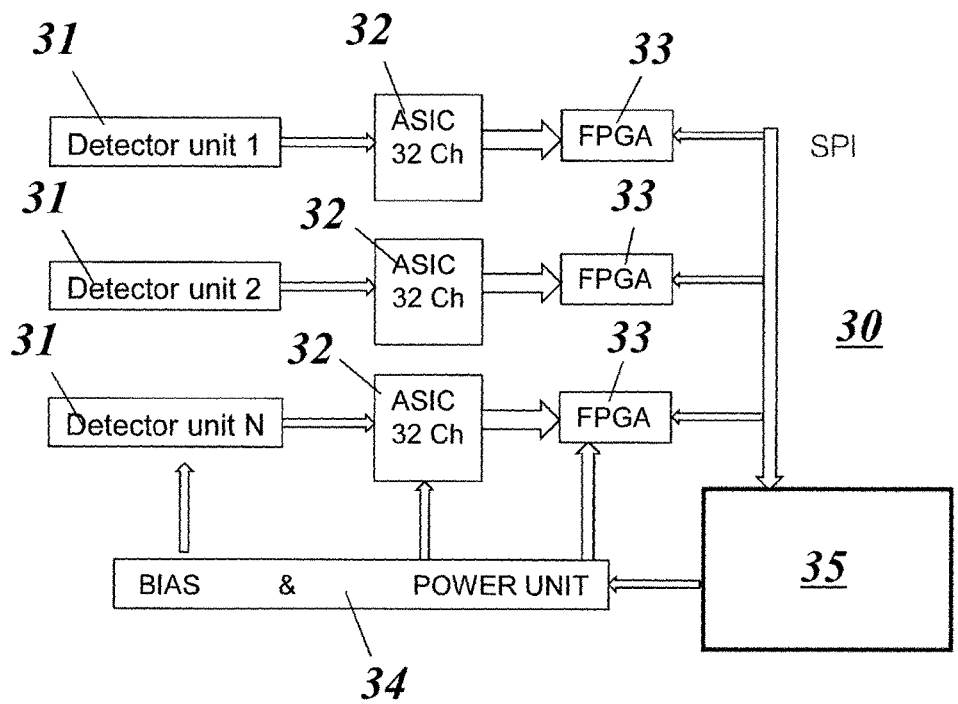
FIG. 7 shows a basic multi-detector scheme comprising several neutron-detecting devices (detectors) according to the invention.

FIG. 7 shows a possible low cost signal-processing scheme 30 for an array of several detectors 31 according to this invention. The signal-processing unit is composed of a fast multi-channel analogue front-end with 32 channel ASICs units 32 that amplify the signals generated by the SiPMs with detectors 31 and apply a threshold. In a second step, the discriminated signal is fed into a field programmable gate array (FPGA) 33 that measures the pulse width of the signal. Particle to particle and particle to noise discrimination is achieved by applying time coincidence as well as pulse width requirements by means of the FPGA 33. The various sub-units are supplied with power by power supply 34. A microcontroller 35 is used to read-out the FPGA 33, regulate the power voltage on the power supply 34 and manage the device communication with external interfaces.

Figure 8:
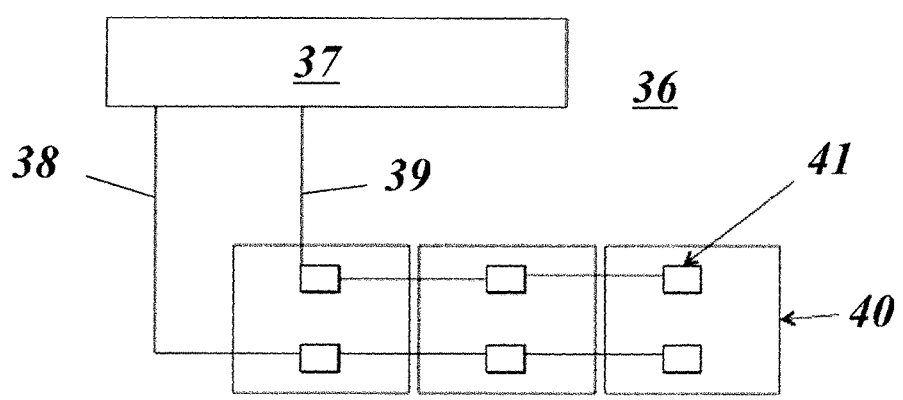
FIG. 8 shows a special configuration of a multi-detector scheme comprising several neutron-detecting devices (detectors) according to the invention, where the number of channels of the signal processing electronics is reduced to save costs.

FIG. 8 shows an embodiment of the invention, where in a cascading scheme 36 the number of channels 38, 39 of the signal processing electronics (coincidence unit 37) is kept low by cascading several SiPMs 41 of unit cells 40 for cost reasons.

FIGS. 9 to 14 show a preferred embodiment of a neutron detecting device or detector 42 according to the invention, where a double-sided neutron converter membrane 47 of the kind shown in FIGS. 2 to 4 has a total area of about 5 m$^2$, arranged in a meandering or accordion style manner in a longitudinal tube 43 (preferably of steel), which is closed by a closure head 44 and contains a scintillation volume 43$a$ filled with noble gas, or the like, through a valve 45 or pinch-off provided on said closure head 44.

Neutron converter membrane 47 is kept in place by a series of parallel moderating plates 46 oriented perpendicular to the longitudinal tube axis, and being assembled from two separate plate elements 46$a$ and 46$b$ with intertwining fingers (see FIG. 12) that subdivide the gas scintillator volume. The scintillating noble gas is slightly pressurized and contained by tube 43, which may have a diameter of 10 cm. The inside of tube 43 is lined with a highly efficient reflector. Printed circuit boards 50 (FIG. 11) with surface mounted SiPMs run down the center of the detector tube 43 and are connected with outside by means of a connecting cable 48.

Figures 9, 10:
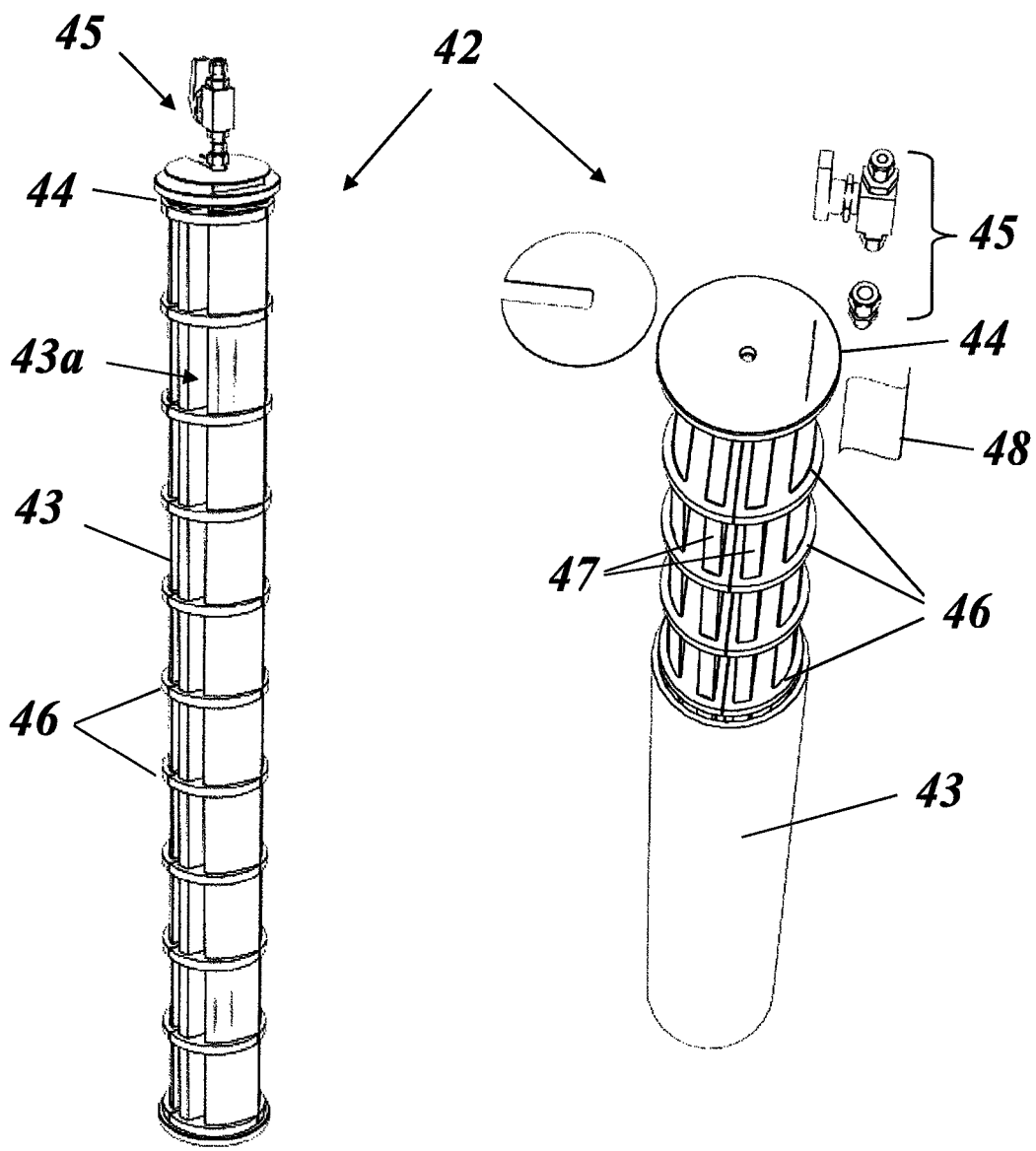
FIG. 9 shows in a partially transparent illustration a preferred embodiment of a neutron detection device according to the invention with a possible meandering suspension of the neutron converter membranes.
FIG. 10 shows in exploded view details of the device according to FIG. 9.
Figure 13:
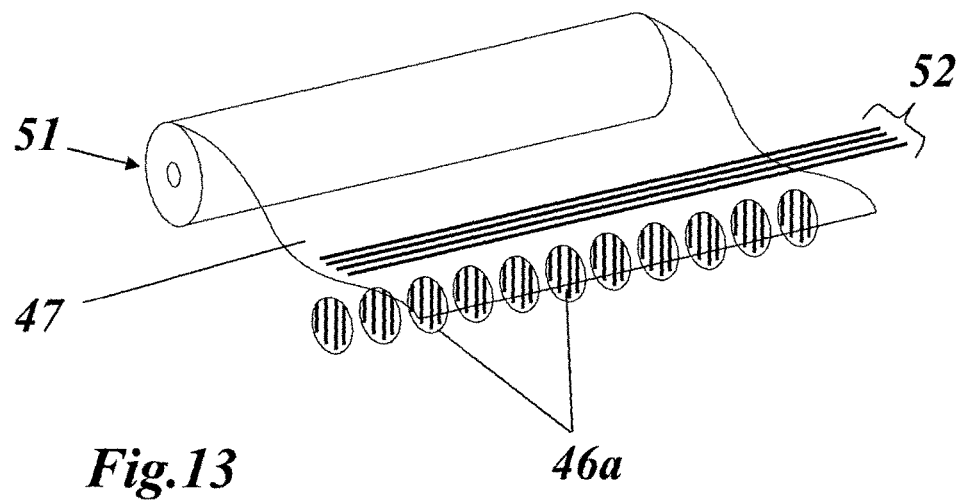
FIG. 13 shows a first step in a method for assembling a detector according to FIGS. 9 and 10.
Figure 14:
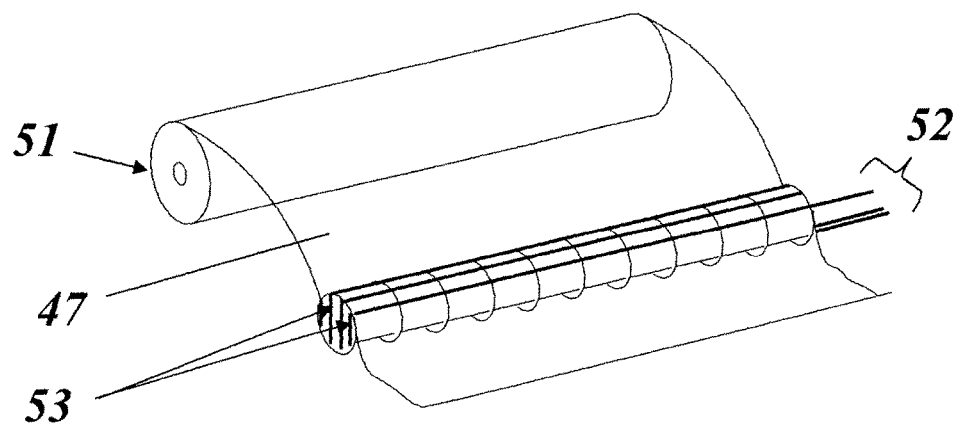
FIG. 14 shows a second step in a method for assembling a detector according to FIGS. 9 and 10.

FIGS. 13 and 14 show a possible assembly method of detector 42 according to FIGS. 9 and 10. A foil reel of a (double-sided) converter membrane or foil 47 is used to supply one foil of a width comparable to the length of tube 43. The stack of moderating plates 46 is kept in place, whereby the upper plate elements 46$a$ or 46$b$ have been removed to get access to the open finger structure of the remaining plate elements 46$b$ or 46$a$. Then, a sufficient length of foil 47 is unrolled from reel 51 and pushed into the slots 53 of the finger structure by means of a parallel arrangement of guide or pushing rods 52.

When the foil 47 has reached its final position (FIG. 14) thereby showing the meandering membrane pattern 49 of FIG. 12$a$, the guide rods 52 are removed and all moderating plates 46 are assembled again so that the meandering foil 47 is held in and supported by the plates 46.

Figure 15:
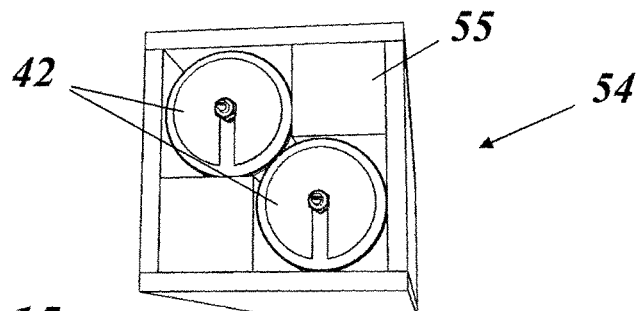
FIG. 15 shows, in a top view, a diagonal two-detector arrangement with detectors according to FIGS. 9 and 10.

The detector 42 of FIGS. 9 and 10 can be used in different arrangements. FIG. 15 shows, in a top view, a diagonal two-detector arrangement 54 with detectors 42 according to FIGS. 9 and 10 in a container 55 with square cross section.

Figure 16:
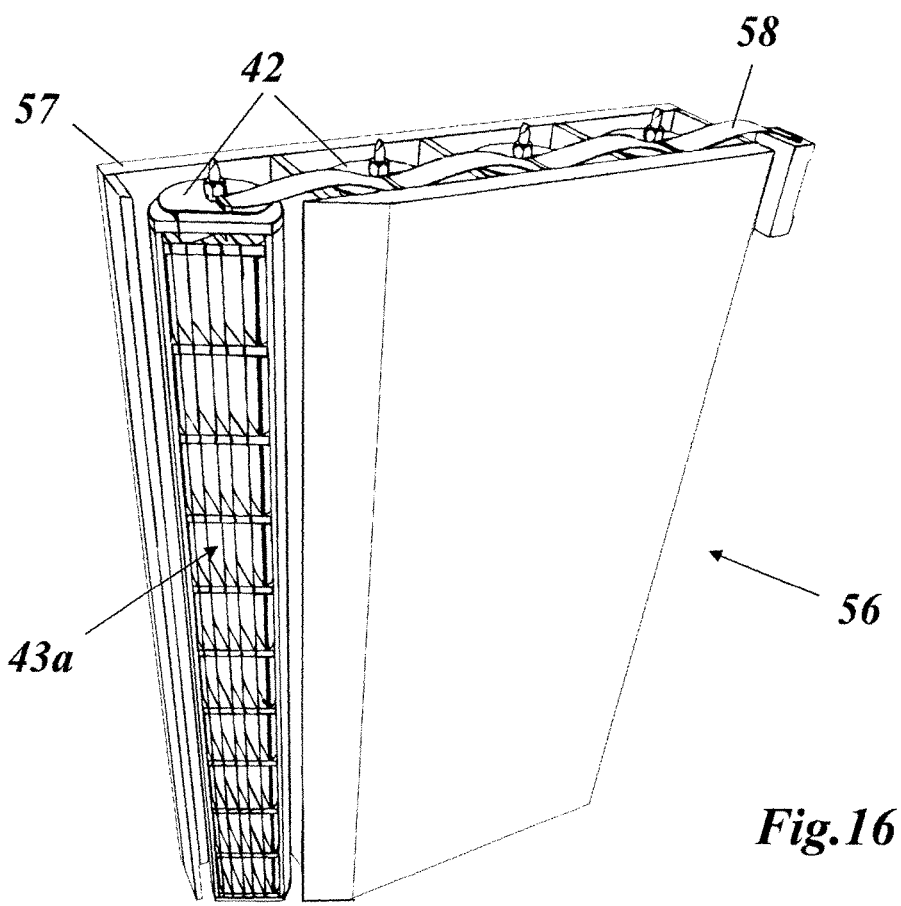
FIG. 16 shows linear multi-detector arrangement with detectors according to FIGS. 9 and 10.

FIG. 16 shows linear multi-detector arrangement 56 with detectors 42 according to FIGS. 9 and 10 in a serial arrangement in a flat rectangular container 57, whereby a common connecting cable 58 is used to connect the internal SiPMs to the external signal processing means (not shown).

Figure 17:
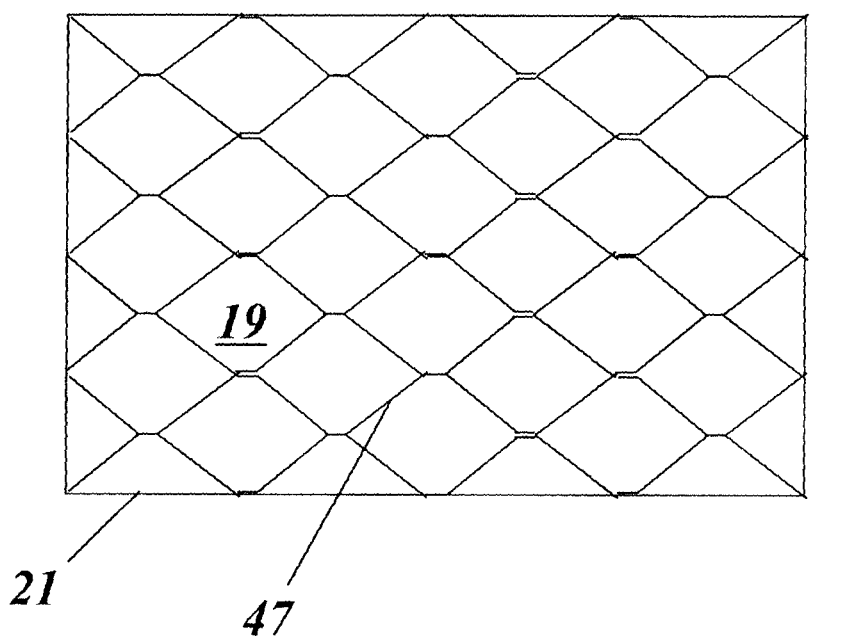
FIG. 17 shows an embodiment of a neutron-detecting device, where the neutron converter membranes are suspended by welding or gluing several foils to form an accordion style two or three dimensional structure.

FIG. 17 shows an embodiment in which the foil or converter membrane 47 can be self suspended by gluing or welding several foils together in defined points such as to form a multidimensional structure that maximizes converter area while keeping foils sufficiently separated to allow neutron capture products to deposit maximal energy in the scintillating gas in scintillation volume 19 without colliding with an obstacle. Alternatively, such structure may be achieved by cleverly packing self-supporting geometrical shapes—such as small cylinders and cones—made of converter foil.

The ability to detect and respond to the unauthorized transportation, accidental release or terrorist release of various radioactive materials over a wide area is becoming more and more probable due to the break-up of countries having nuclear weapons and nuclear reactors. Radioisotope smuggling and black market sales of radioactive material has increased substantially in the past years.

Therefore, the neutron detecting device according to the invention is a valuable tool for being part of a detector network that enables authorities to detect actual locations and moving profiles of such radioactive material. Some proposals in this area have already been made in the past.

Document US 2014/224964 A1 discloses a system including at least one imager having a pixelated chip that is capable of relaying information regarding the interaction of the high energy particle with the pixel while simultaneously obtaining an image, a central command center with a processor for receiving and interpreting said information from the imager, and for issuing operating instructions to remotely control the imager, and means for communication between the imager and the central command center. The system may also include at least one processor that is in communication with the imager, which is able to determine that a pixel or pixels have interacted with one or more high energy particle.

Document US 2009/012745 A1 discloses a radiation detection system including many receivers to continuously receive radiation emission data from at least some of a sufficient density of dispersed detectors capable of communicating geo-positions and photon emission counts over a network; the data includes gamma intensities, time stamps, and geo-positions. A processor builds digital image data of the received radiation data for a geographic area by treating gamma-ray proton data from each dispersed detector as a pixel in a low-light image. The processor continuously executes a plurality of statistical computational analyses on the digital image data to separate detected radiation signals from random, undesired signal noise, and known signal noise or sources. The statistical computational analyses include match-filter and/or other convolution techniques. An interface reports to a user when the computational analyses result in detection of a radiation signal and reports a location of one or more of the dispersed detectors that contribute to the detection.

Document U.S. Pat. No. 8,502,158 A shows a detection unit for detecting ionizing radiation including a crystal that interacts with incoming radiation; a processing module that analyzes the incoming radiation detected by the crystal; a positioning module that determines position of the detection unit; and a network interface module that receives and transmits time stamped radiation data and position information from/to a plurality of other detection units. The detection unit automatically identifies other detection units that are located close to form a cluster. The detection unit also includes radiation data integration logic that integrates the incoming radiation data from all detectors in cluster, the position of the detection unit, the received radiation data from other detection units and the received position information from other detection units in real time, and process it simultaneously, that allows significantly improve performance and reliability.

Figure 18:
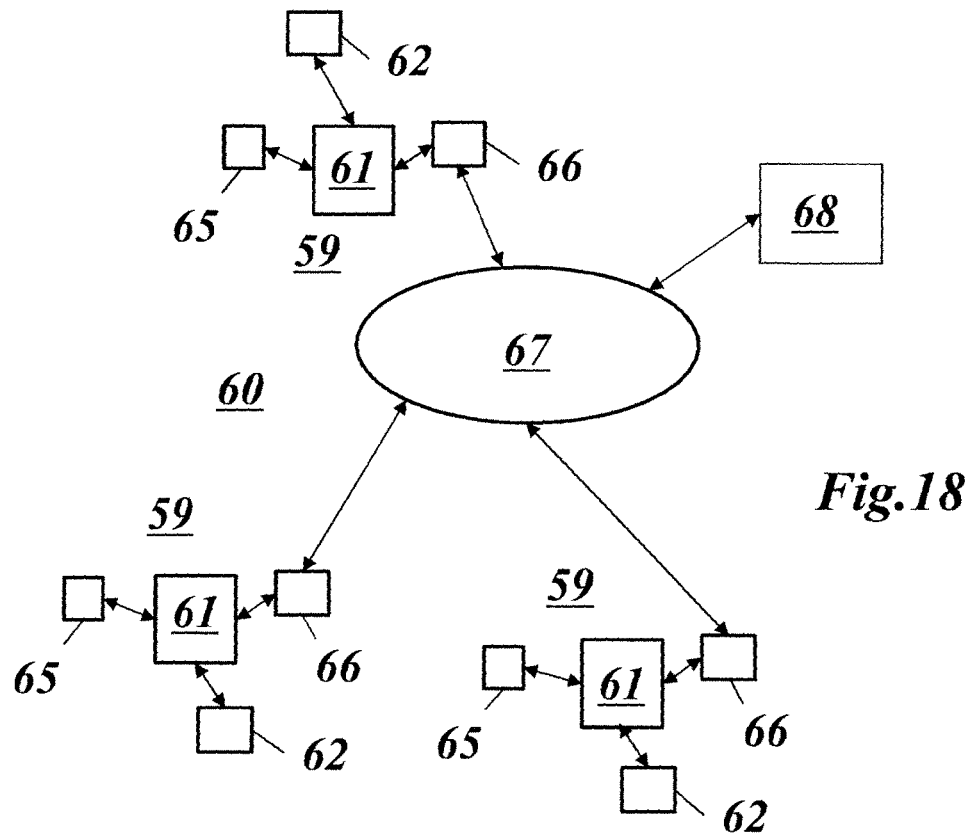
FIG. 18 shows an example of a monitoring detector system with a plurality of neutron detectors in detector subunits positioned at different places and connected via a wireless network with a control center.
Figure 19:
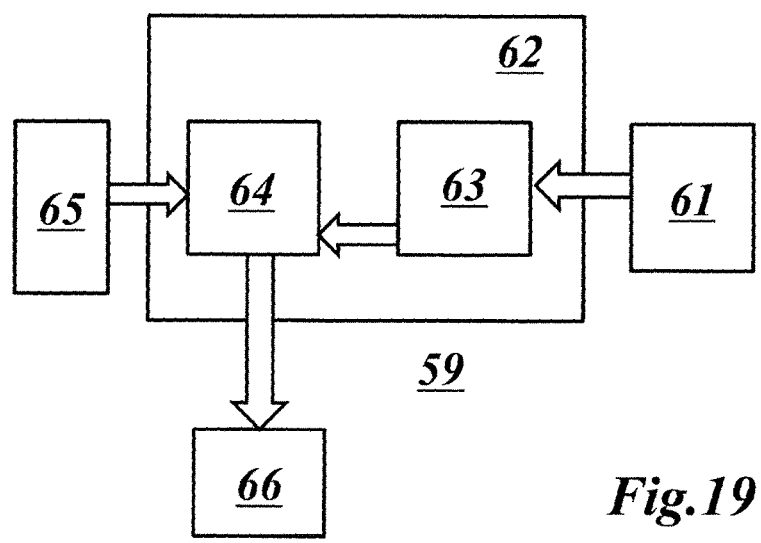
FIG. 19 shows a simplified scheme of a single detector subunit.

As shown in FIGS. 18 and 19, a neutron detecting device 61 according to the invention may be part of a (e.g. wide area) detector system 60, wherein a plurality of detector subunits 59 are connected with a control center 68 for evaluating detector data, which have been sent to control center 68 via a wireless network 67.

The neutron detecting device 61 according to the invention may be part of at least one of said detector subunits 59. The subunits 59 may be stationary and/or mobile, i.e. mounted in a car or carried by a person. Within such detector subunit 59 neutron detecting device 61 is connected to a computer, especially a single board computer 62. Single board computer 62 is connected to a network unit 66, which is able to establish a wireless data transmission between subunit 59 and control center 68 via network 67. Single board computer 62 comprises a detector software 63, which is used to monitor detector health and is responsible for neutron counting. Single board computer 62 further comprises a data aggregation software/network protocol 64.

To determine and transmit the actual position of the detector subunit 59, a GPS unit 65 may be provided, which is connected to said single board computer 62.

With the neutron detecting device according to the invention it is possible to evaluate the presence, the intensity and/or the type of gamma radiation interacting with the scintillating volume. When accumulating the interaction events of neutrons and Gamma radiation with the scintillation volume over a certain period of time, preferably between 1 and 100 seconds, overlapping energy spectra of Gamma radiation and neutrons, and the accompanying noise are obtained as shown in FIG. 20, where 69 denotes the Gamma energy spectrum and 70 denotes the neutron energy spectrum.

Figure 20:
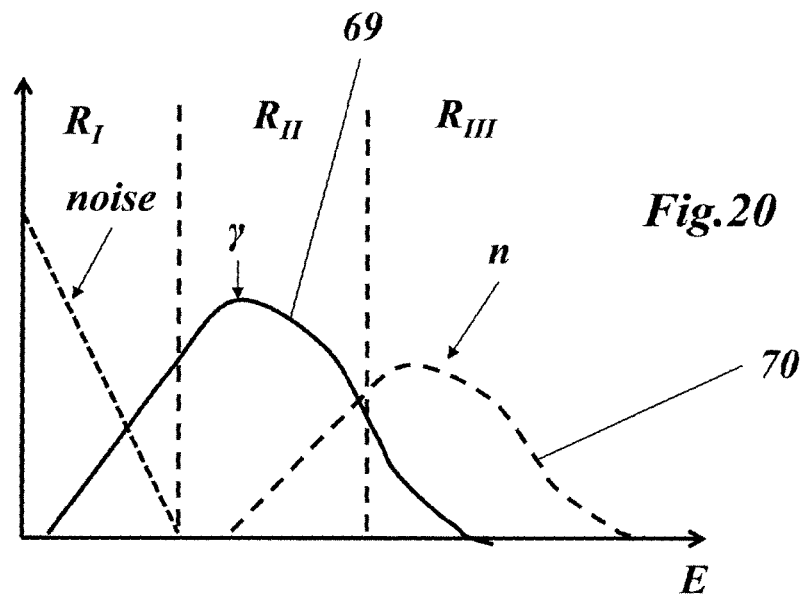
FIG. 20 shows exemplary overlapping energy spectra of Gamma and neutron interaction events accumulated over a certain period of time and the accompanying noise.
Figure 21:
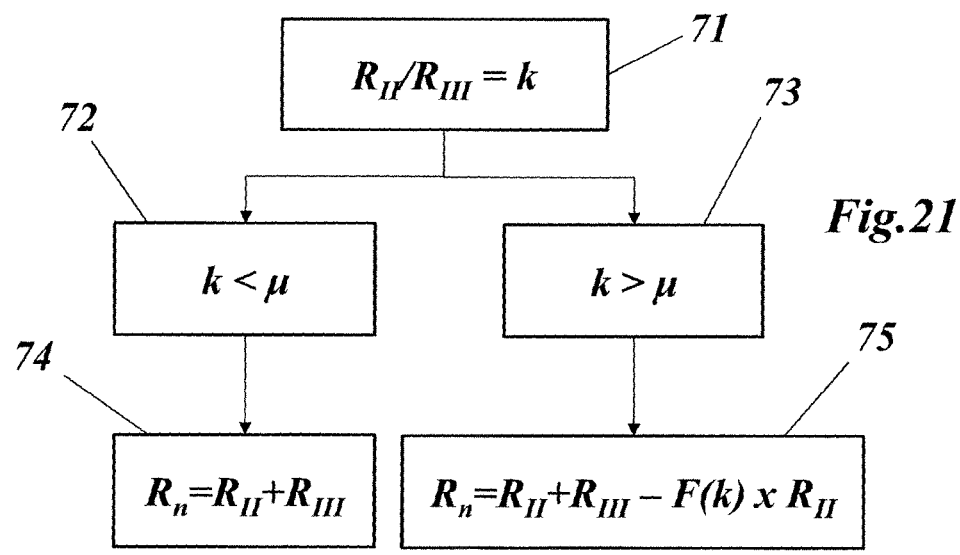
FIG. 21 shows an analyzing scheme for a spectral distribution according to FIG. 20.

Analyzing a spectral distribution as shown in FIG. 20 may be done following a scheme according to FIG. 21. The two overlapping spectral distributions 69 and 70 resulting from the simultaneous interaction of Gamma radiation and neutron radiation with the scintillating volume and/or the converter foil are analyzed employing statistical methods.

In a first step, the Gamma/neutron count rate ratio 71 is determined and results in a certain value k. Then, k is compared to a predetermined reference value p (comparisons 72, 73). If k<µ, count rates $R_{II}$ (for Gamma radiation) and $R_{III}$ (for neutrons) are simply added to give the neutron count rate $R_n$ (74). If k>µ, a weighted term $F(k) \times R_{II}$ is subtracted from the sum $R_{II} + R_{III}$ to give the neutron count rate $R_n$ (75). Thus, in this case, the net neutron count rate 75 can be determined by subtracting the spectral response 69 obtained by the gamma radiation from the total spectrum.

LIST OF REFERENCE NUMERALS

10,10',10" neutron converter foil (foil, membrane)
11,11' substrate
12,12' neutron conversion layer (e.g. coating)
13,13' wavelength shifting layer (e.g. coating)
14,27 scintillation (incident)
15 scintillation light (short wavelength)
16,16' visible light
17 decay product
18 neutron (incoming)
19,23 scintillation volume (e.g. filled with noble gas)
20,20' neutron detecting device
21,22 reflector
24 converter membrane
25 substrate (transparent film)
26 transparent LiF coating (on both sides)
28 triton
29 light sensing device (e.g. Silicon Photomultiplier SiPM)
30 signal processing scheme
31 detector
32 analogue multi-channel front-end unit
33 filed programmable gate array FPGA
34 power supply
35 microcontroller
36 cascading scheme
37 coincidence unit
38,39 channel
40 unit cell
41 SiPM
42 detector
43 tube (e.g. steel)
43a scintillation volume
44 closure head
45 valve
46 moderating plate
46a,b plate element
47 converter membrane (double-sided)

48 connecting cable
49 membrane slot (meandering)
50 detector board
51 foil reel
52 guide rod
53 slot
54,56 detector arrangement
55,57 container
58 connecting cable
59 detector subunit
60 detector system
61 neutron detecting device
62 computer (single board)
63 detector software
64 data aggregation software/network protocol
65 GPS unit
66 network unit
67 network
68 control center
69 Gamma energy spectrum
70 neutron energy spectrum
71 Gamma/neutron ratio
72,73 comparison with reference value
74,75 neutron count rate
A reflective material (e.g. dielectric mirror)

The invention claimed is:

1. A neutron conversion foil for being used in a neutron detector, said neutron conversion foil being configured to be arranged in a scintillator volume and comprising a substrate having a first side and a second side,
    whereby said substrate is covered at least on one of said first side and said second side with a neutron conversion layer made of a neutron reactive material and being capable of capturing neutrons to thereafter emit light and/or charged particles to be detected by a light sensing device, and
    whereby said neutron conversion layer and substrate are transparent to light originating from conversion of the neutrons, and are configured to be arranged such that the light originating from the conversion of the neutrons can pass through and away from the substrates and neutron conversion layers of one or several of said neutron conversion foils and thereafter be collected and detected by the light sensing device.

2. The neutron conversion foil as claimed in claim 1, wherein said substrate is covered on said first side and said second side with a neutron conversion layer made of a neutron reactive material and being capable of capturing neutrons to thereafter emit light and/or charged particles.

3. The neutron conversion foil as claimed in claim 1, wherein said neutron conversion layer contains Li-6 or B-10.

4. The neutron conversion foil as claimed in claim 3, wherein said neutron conversion layer comprises a coating applied to the substrate, wherein the coating comprises LiF and a suitable binder in a weight ratio between 1:1 and 15:1, and that appropriate measures such as LiF nanosizing or refractive index matching are performed to ensure high transparency.

5. The neutron conversion foil as claimed in claim 3, wherein said neutron conversion layer has a layer thickness of between 1 µm and 40 µm, especially between 3 µm and 20 µm.

6. The neutron conversion foil as claimed in claim 1, wherein said substrate is a transparent PET foil.

7. The neutron conversion foil as claimed in claim 6, wherein said transparent PET foil has a thickness of between 2 µm and 19 µm.

8. The neutron conversion foil as claimed in claim 1, wherein each of said neutron conversion layers is overcoated with a wavelength shifting layer being capable of shifting short wavelength light impinging upon it and reemitting light with a wavelength to which said neutron conversion foil is transparent.

9. The neutron conversion foil as claimed in claim 8, wherein said wavelength shifting layer contains Tetra Phenyl Butadiene (TPB), an organic wavelength shifter, or an organo silicate compound.

10. The neutron conversion foil as claimed in claim 9, wherein said wavelength-shifting layer has a layer thickness of between 0.05 µm and 1 µm, especially between 0.05 µm and 0.2 µm.

11. The neutron conversion foil as claimed in claim 1, wherein that said substrate is a mesh.

12. A neutron detecting device comprising:
    a scintillation volume filled with a scintillating material such as a noble gas;
    at least one light sensing device in optical contact with the scintillating volume;
    one or more neutron conversion foils, the neutron conversion foils each comprising a substrate having a first side and a second side, whereby said substrate is covered at least on one of said first side or said second side with a neutron conversion layer made of a neutron reactive material and being capable of capturing neutrons to thereafter emit light and/or charged particles to be detected by the at least one light sensing device, and whereby said neutron conversion layer and substrate are transparent to light originating from conversion of the neutrons, and are configured to be arranged such that the light originating from the conversion of the neutrons can pass through and away from the substrate and neutron conversion layers of one or several of said neutron conversion foils and thereafter be collected and detected by the at least one light sensing device,
    wherein said one or more neutron conversion foils are positioned in said scintillation volume and in optical contact with said scintillating material, and are configured to be arranged such that charged conversion products arising from neutron capture in said one or more neutron conversion foils escape into said scintillation volume and produce light, to which said one or more neutron conversion foils is transparent, and wherein the produced light is detected by the light sensing device.

13. The neutron detecting device as claimed in claim 12, wherein at least one light-sensing device is provided in optical contact with said scintillation volume.

14. The neutron detecting device as claimed in claim 13, wherein said at least one light sensing device is a solid state light sensor, especially one of a silicon photomultiplier (SiPM) or pixelated Geiger mode avalanche photodiode.

15. The neutron detecting device as claimed in claim 13, wherein said scintillation volume is composed primarily of a noble gas such as helium, argon or xenon or a mixture of noble gases, such as helium doped with xenon, and/or wherein said scintillation volume contains predominantly PVT or a liquid scintillator, thereby allowing the simultaneous measurement of gammas and neutrons.

16. The neutron detecting device as claimed in claim 15, wherein said scintillation volume is predominantly filled with helium, thereby allowing the simultaneous measurement and distinction of fast neutrons, thermal neutrons, and/or photons and electrons produced by the interaction of photons with a detector wall, and/or with xenon, thereby allowing gamma spectrometry to be performed while also measuring neutrons.

17. The neutron detecting device as claimed in claim 14, wherein said at least one solid state light sensor is arranged within said scintillation volume.

18. The neutron detecting device as claimed in claim 15, wherein an in-situ gas purification device such as a getter is immersed in the gas of said scintillation volume, thereby assuring a stable gas composition.

19. The neutron detecting device as claimed in claim 13, wherein said scintillation volume is surrounded by a highly reflective material in the area of which a plurality of light sensing devices can be interspersed.

20. The neutron detecting device as claimed in claim 12, wherein plural neutron conversion foils are arranged in parallel in said scintillation volume.

21. The neutron detecting device as claimed in claim 12, wherein said neutron detecting device is part of a detector system, and wherein a plurality of detector subunits are connected with a control center for evaluating detector data via a wireless network.

22. The neutron detecting device as claimed in claim 21, wherein said neutron detecting device is part of at least one of said detector subunits.

23. The neutron detecting device as claimed in claim 22, wherein said neutron detecting device is connected within said detector subunit to a single board computer, which itself is connected to a network unit and comprises detector software and a data aggregation software/network protocol.

24. The neutron detecting device as claimed in claim 23, wherein a GPS unit for determining the actual position of said detector subunit is connected to said single board computer.

25. A method for operating the neutron detecting device according to claim 12, wherein signals arising from a neutron conversion in said one or more neutron conversion foils are discerned from signals arising from said scintillation volume by pulse shape discrimination, whereby the signals involving light emitted by said one or more neutron conversion foils have a different time structure than the signals from said scintillation volume.

26. The method as claimed in claim 25, wherein light signals arising directly or indirectly from said neutron conversion in said one or more neutron conversion foils are discerned from signals from said scintillation volume alone by pulse shape discrimination, whereby the signals from neutron conversion have a different time structure than the signals from said scintillation volume.

27. A method for operating the neutron detecting device according to claim 12, wherein the presence, the intensity and/or the type of gamma radiation interacting with the scintillating volume is determined by analyzing the distribution of the energy spectrum of the interaction events accumulated during a predetermined period of time of operation, especially in a range from 1 to 100 seconds.

28. A method for operating the neutron detecting device according to claim 12, wherein two overlapping spectral distributions resulting from the simultaneous interaction of gamma radiation and neutron radiation with the scintillating volume and/or the converter foil and being accumulated during a predetermined period of time of operation, especially in a range from 1 to 100 seconds, are analyzed employing statistical methods, whereby a net neutron count rate can be determined by subtracting the spectral response obtained by the gamma radiation from the total spectrum.

29. The neutron conversion foil as claimed in claim 1, wherein the neutron conversion foil comprises a flexible foil.

30. The neutron conversion foil as claimed in claim 1, wherein the neutron conversion foil comprises a foil which is sufficiently thin, such that deposition of energy by gamma radiation is reduced.

* * * * *

UNITED STATES PATENT AND TRADEMARK OFFICE
CERTIFICATE OF CORRECTION

| | |
|---|---|
| PATENT NO. | : 10,274,619 B2 |
| APPLICATION NO. | : 15/538389 |
| DATED | : April 30, 2019 |
| INVENTOR(S) | : Ulisse Gendotti et al. |

It is certified that error appears in the above-identified patent and that said Letters Patent is hereby corrected as shown below:

In the Specification

Column 1, after Title, Lines 6 – 9, delete "This invention was made with Government support under Contract No. HR0011-14-C-0094 awarded by the Defense Advanced Research Projects Agency. The Government has certain rights to this invention."

Column 1, Line 19, after first paragraph of CROSS-REFERENCE TO RELATED APPLICATIONS, below the last word "reference", insert -- This invention was made with Government support under Contract No. HR0011-14-C-0094 awarded by the Defense Advanced Research Projects Agency. The Government has certain rights to this invention. --

Signed and Sealed this
Thirtieth Day of July, 2019

Andrei Iancu
*Director of the United States Patent and Trademark Office*